(12) United States Patent
Ng

(10) Patent No.: US 7,847,486 B2
(45) Date of Patent: Dec. 7, 2010

(54) LED LIGHTING SYSTEM

(75) Inventor: James K. Ng, Seattle, WA (US)

(73) Assignee: Dr. LED (Holdings), Inc, Tortola (VG)

( * ) Notice: Subject to any disclaimer, the term of this patent is extended or adjusted under 35 U.S.C. 154(b) by 771 days.

(21) Appl. No.: 11/659,295

(22) PCT Filed: Jul. 13, 2005

(86) PCT No.: PCT/US2005/024967

§ 371 (c)(1),
(2), (4) Date: Feb. 2, 2007

(87) PCT Pub. No.: WO2006/019897

PCT Pub. Date: Feb. 23, 2006

(65) Prior Publication Data

US 2009/0021185 A1    Jan. 22, 2009

(51) Int. Cl.
*H05B 41/00* (2006.01)
(52) U.S. Cl. .................... 315/119; 315/291
(58) Field of Classification Search ............ 315/86–93, 315/119, 121, 122, 123, 127, 128, 185 R, 315/186, 192, 193, 209 R, 210, 217, 224, 315/225, 226, 288, 291, 294, 295, 297, 299, 315/300, 301, 306, 307, 308, 310, 312, 313
See application file for complete search history.

(56) References Cited

U.S. PATENT DOCUMENTS

| | | | |
|---|---|---|---|
| 6,118,259 A * | 9/2000 | Bucks et al. | 323/312 |
| 6,351,079 B1 * | 2/2002 | Willis | 315/200 A |
| 6,697,402 B2 * | 2/2004 | Crawford | 372/38.03 |
| 7,038,365 B2 * | 5/2006 | Kang | 313/264 |
| 7,345,428 B2 * | 3/2008 | Turner | 315/111.21 |
| 2002/0140380 A1 * | 10/2002 | Biebl | 315/291 |
| 2002/0149327 A1 * | 10/2002 | Kaminski | 315/248 |
| 2004/0135160 A1 * | 7/2004 | Cok | 257/88 |
| 2005/0162096 A1 * | 7/2005 | Bertrand | 315/291 |

\* cited by examiner

*Primary Examiner*—Douglas W Owens
*Assistant Examiner*—Jianzi Chen
(74) *Attorney, Agent, or Firm*—Jeffrey Pearce

(57) ABSTRACT

A lighting system has an array (100) of at least one light-emitting solid-state element such as a light-emitting diode (LED) or a laser diode. A voltage source (10), which may supply either alternating or direct current, energizes the array. Array state circuitry (125; Q2, R2), electrically connected in series with the array (100), senses at least one state of the array, such as the amount of current passing through the array, or temperature. Secondary circuitry (127; R1, Q1; 200, 201, 202; 200, R4, Q1; 126, 127) is connected in parallel with the array (100). A switching component (Q1; Q1, Q3; 202) adjusts the current passing through the secondary circuitry in accordance with the sensed state of the array such that current through the array is maintained substantially constant. A third, parallel, excess current shunt path may also be provided, in which case so is excess current shunt circuitry, which senses current flowing in the secondary circuitry and shunts current in the secondary circuitry in excess of an excess current threshold to the excess current shunt path, whereby overflow current above a first threshold for the array (100) is shunted away from the array and excess current above a second threshold is shunted from the secondary circuits to the excess current shunt circuitry. A wide-angle mounting arrangement is also provided for the array.

16 Claims, 12 Drawing Sheets

LED LIGHTING SYSTEM

TECHNICAL FIELD

This invention relates to lighting systems that use multiple light-emitting diodes (LEDs) or laser diodes.

DESCRIPTION OF THE RELATED ART

There has been a need for more and more efficient lighting since the only man-made lighting source was fire. Solid-state physics has provided several breakthroughs, however, that will probably change the principle of operation of almost all lighting systems in common use.

LEDs vs. Incandescent

Incandescent light bulbs are commonly used for indicator lamps, task lamps, general lighting, decorative lamps, warning lamps, traffic lamps and the like. However, incandescent bulbs including halogen bulbs, and to a lesser extent even plasma-based fluorescent, are generally inefficient in terms of energy use and have relatively short lifetimes, which leads to frequent replacement. Typically, less than 2% of the electrical energy going into an incandescent light bulb is transformed to visible light energy, the rest being converted into heat. Significant energy savings can be had by the use of light-emitting diodes (LEDs) as a light source.

Super-Bright (Super-Luminescent) LEDs

LEDs are much more efficient (in terms of lumens-per-watt) than incandescent and fluorescent lights; moreover, LEDs generally last much longer. This is particularly true of the class of LEDs known as "super-luminescent" or "super-bright," which have already found uses in such applications as automobile taillights and traffic signal lights.

LED Characteristics

As is well known, and as their name implies, LEDs are diodes. They are therefore direct-current (DC) devices and are easily damaged by excessive reverse voltage, forward current, or too high operating temperature. LEDs are, moreover, very sensitive to a change in forward voltage ("Vf"), that is, the positive DC voltage applied across the anode and cathode of the LED: A small increase in forward voltage will result in an exponential increase in LED current. The resulting high temperature can instantly destroy an LED. To maintain the advantages (high lumens-per-watt, long service life, etc.) of LEDs as a lighting source, the LEDs must be operated within their safe operating regions at all times.

LED Operating Voltage and Current

To maximize the benefits of super-bright LEDs for illumination or as indicators, the forward DC current of a given type of LED is biased at a level specified by the manufacturer. For example, for a 5 mm LED, the current is typically biased at about 25 mADC; this gets the most light out of the LEDs while maintaining them within their safe operating regions, provided the ambient temperature does not exceed certain a level, which is also specified by the manufacturer. The resulting LED lighting system then enjoys the long service life and high lumens-per-watt of the LEDs. However, the forward voltages at a given current may vary considerably even within the same LED wafer. For example, in a typical super-bright blue LED wafer, the forward voltages at 25 mA could vary between 3.0 VDC to 3.5 VDC. Furthermore, this forward voltage also depends on the temperature of the LED: Typically, the voltage decreases at about 2 mV per degree Celsius increase in temperature.

Constant Energy Transfer to LEDs

In arrangements that use super-bright LEDs as the light source, many LEDs are typically connected in both a series and parallel arrangement. Because the LEDs are usually packed together to form a single LED lighting system in a confined space, heat dissipation is limited. To optimize the performance of the LED light system, while still operating the LEDs in their safe operating regions, a substantially constant LED energy transfer is needed, that is, the energy from the power source into the LEDs should be maximized and maintained at a relatively constant level, while energy wasted as heat in the peripheral circuit components should be minimized; at the same time, variations of input voltage, peripheral component parameters, and LED forward voltage must be addressed. Without this optimization, LED lighting systems either under-perform, that is, they do not produce the lumens-per-watt they could, or are under-designed, that is, they must operate outside their safe operating regions.

Power Sources

Many different electrical power sources are used to drive LED lighting systems. These include both alternating-current (AC) and direct-current (DC) power sources, such as those provided by wall sockets (120 or 240 VAC at 50 or 60 Hz), step-down transformers (12 or 24 VAC), solar panels (typically a multiple of 0.3 VDC), battery cells (typically a multiple of 2 VDC), or DC power supplies (typically 5, 12, 15, etc. VDC) and the like are all voltage sources used to drive conventional LED lighting systems.

Conventional alternating-current (AC) electrical power sources such as those provided by wall sockets from power lines (Line Voltage) are typically 110 or 220 VAC at 50 or 60 Hz. Other voltage and frequency combinations are also available, for example, 100 VAC is used in-part of Japan, and 48 VAC 20kHz was proposed in a space station.

AC voltage sources must first be rectified to become DC voltage sources before using them to drive LEDs. Further, line voltage components that would be required to compensate for these problems are usually rather large and more expensive than their lower voltage counterparts.

One approach is to use a step-down transformer to lower the line voltage before rectifying the AC voltage source; however, line voltage step-down transformers are even bigger than line voltage components. Moreover, typical low-voltage lighting applications such as those used for indoor halogen lights and outdoor landscape lights provide a nominal 12 VAC voltage source to the lighting fixtures; however, the typical output voltages of step-down transformers could vary between −10% to +30% of the nominal voltage, that is, from 10.8 to 15.6 VAC. An alternative approach is to use an electronic transformer that uses complex power electronics, but in most cases this is too expensive and too big as well.

LED lighting system circuits for alternating current (AC) line voltage applications are mostly adapted from conventional LED circuits, which fail to address the issue of high-level rectified line voltage, component size, and the issue of constant energy transfer. Conventional LED circuit designs mainly address the variations of LED forward voltages and variations of voltage sources. In many applications, this shortcoming is not consequential. For example, known LED circuits like those used in video recorders do not require efficient and/or constant energy transfer, as typically there is plenty of space for peripheral circuit components, such as power resistors, to dissipate heat. Furthermore, these LEDs usually operate at a small fraction of their current ratings and the energy used is typically an insignificant amount compared to that of the system as a whole.

Use of rectified AC supply voltage, or a pure DC supply voltage, avoids some of the complications of AC, but is not without complications of its own. In particular, even with a pure DC voltage source to drive an LED array, energy-controlling circuitry must be used, since the combined forward voltage of an LED array is never equal to the exact voltage provided. Further, the actual output voltage of any given voltage source is rarely exactly equal to its specified nominal voltage. As just on example, the nominal output voltage of 12 VDC battery systems like those used in automobiles is seldom exactly 12 VDC but rather typically varies considerably between about 11V DC, when the battery is discharged or discharging, and more than 15V DC, when the battery is being charged.

Conventional (Resistor) Approach to LED Lighting Systems

In one conventional approach, AC voltage sources are rectified to DC with a bridge circuit BR before connecting to the LEDs. Second, power resistors are included to limit the current, to address the source voltage variations and LED forward biasing voltage variations that limit the maximum number of LEDs that can be connected in series; this results in a energy-inefficient LED lighting system. A simplified version of such a configuration is illustrated in FIG. 1A. In some of these systems, the voltage is first stepped down by a transformer XFMR before rectification, as is illustrated in FIG. 1B. Sometimes, a voltage regulator VREG is also used to provide more predictable voltages, as shown in FIG. 2A, although an even simpler battery-resistor circuit (FIG. 3) is also in use; again, a step-down transformer may be included before the bridge circuit, as illustrated in FIG. 2B. These known arrangements are in most cases physically too big or not efficient enough to use as an LED lighting system. These known arrangements also either under-perform or are under-designed, as explained above. Furthermore, most energy (typically at least 50%) going into such LED lighting systems is wasted as heat in the peripheral circuit components such as the power resistors and voltage regulators.

What is needed is a high energy-efficient approach that optimizes the energy that goes into an LED lighting system from a given power source, which also reduces the energy that is wasted as heat in the peripheral components. This approach should address variations of the ambient temperature, LED forward voltage, peripheral component parameters, and input power source while still maintaining the LEDs in their safe operating regions. The size and number of components should also be minimized, while maintaining a substantially constant supply of energy to the LEDs. This invention provides such an approach.

Omni-Directional Mounting

Even assuming that the problems of efficient energy transfer in LED lighting systems are overcome, there should preferably also be some convenient way to mount and arrange the LEDs so that complete 360 degree coverage can be had. This will then in turn enable the LED lighting system to be a convenient after-market replacement for existing light bulbs. The invention also has an embodiment that provides for such an arrangement and mounting.

SUMMARY OF THE INVENTION

Figure 1A:
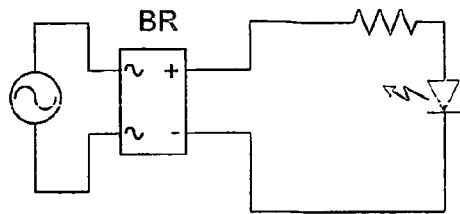
FIGS. 1A, 1B, 2A, 2B, and 3 illustrate various approaches found in the prior art for limiting or regulating voltage or current in an LED lighting system.
Figure 1B:
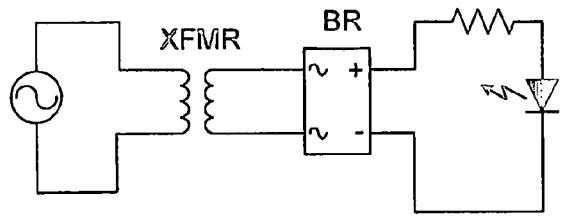
Figure 2A:
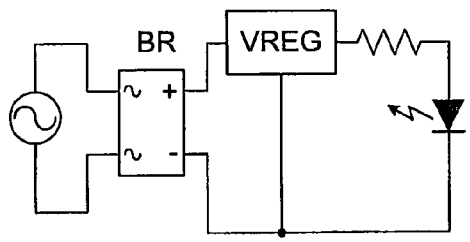
Figure 3:
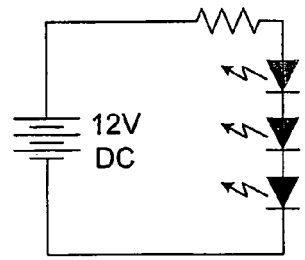
Figure 2B:
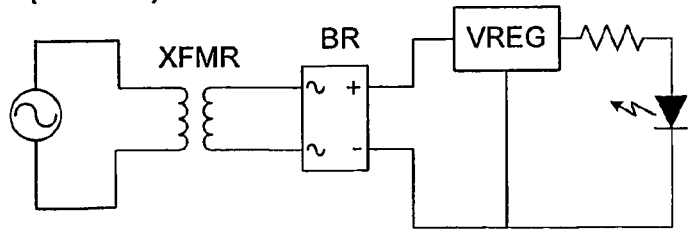

The invention has various embodiments and aspects. In general, the invention operates in the content of a lighting system that has an array of at least one light-emitting, solid-state element such as a light-emitting diode (LED) or laser diode, and a power source that energizes the array. Array state circuitry is electrically connected in series with the array and senses at least one state of the array. Secondary circuitry is connected in parallel with the array and a switching component adjusts the current passing through the secondary circuitry in accordance with the sensed state of the array such that current through the array is maintained substantially constant.

The invention may be used both where the voltage source supplies direct current as well as alternating current. Where the voltage source supplies alternating current, the invention preferably further comprises rectification circuitry such as a bridge that rectifies the AC current before it is applied to the array.

A capacitor may be connected in parallel with the array so as to smooth and average the current applied to the array. Certain embodiments further including a current-limiting element in series with the AC voltage source and between the voltage source and the array, the AC voltage source and the current-limiting element together forming an AC current source for the array.

The invention may be used with a wide variety of DC voltage sources as well. For example, current to the array may be supplied by a battery, an array of photoelectric elements, a radio frequency receiving circuit that supplies the array with current extracted from ambient RF energy, or any combination of these or other DC sources.

One example of an array state that is sensed is the amount of electric current passing through the array. Another example is temperature, in which case the array state circuitry preferably includes a temperature-sensitive element that, upon sensing a temperature greater than a threshold temperature, chokes off biasing current to the secondary circuitry and thereby reduces the array's nominal current.

In some embodiments of the invention, the secondary circuitry includes a load, through which passes overflow current shunted from the array by the array state circuitry and the switching component. Various loads may be used. For example, the load may one or more resistive elements. As another example, the load could be a secondary array.

According to one embodiment of the invention, the invention further comprises an excess current shunt path connected in parallel with the array and the secondary circuitry; and excess current shunt circuitry, which senses current flowing in the secondary circuitry and shunts current in the secondary circuitry in excess of an excess current threshold to the excess current shunt path. Overflow current above a first threshold for the array is shunted thereby away from the array and excess current above a second threshold is shunted from the secondary circuitry to the excess current shunt circuitry.

According to another option aspect of the invention, the lighting system further comprises a curved base on which the light-emitting, solid-state elements of the array are mounted such that the light beams of adjacent elements overlap and the array as a whole provides wide-angle illumination. As one example of an advantageous geometry, the base may be substantially cylindrical.

DESCRIPTION OF THE INVENTION

In broadest terms, the various aspects of the invention described below generally involve additional, secondary circuitry connected in parallel with an m-by-n array 100 of LEDs in order to provide more efficient use, in one or more ways, of the energy applied to drive the LED array. This additional circuitry operates to maintain the current through the array substantially constant. The invention may also be used to efficiently implement a system based on an array of laser diodes. The invention is described below with reference to LEDs merely for the sake of simplicity—every reference to an LED may thus be assumed to apply equally to a laser diode.

Figure 4A:
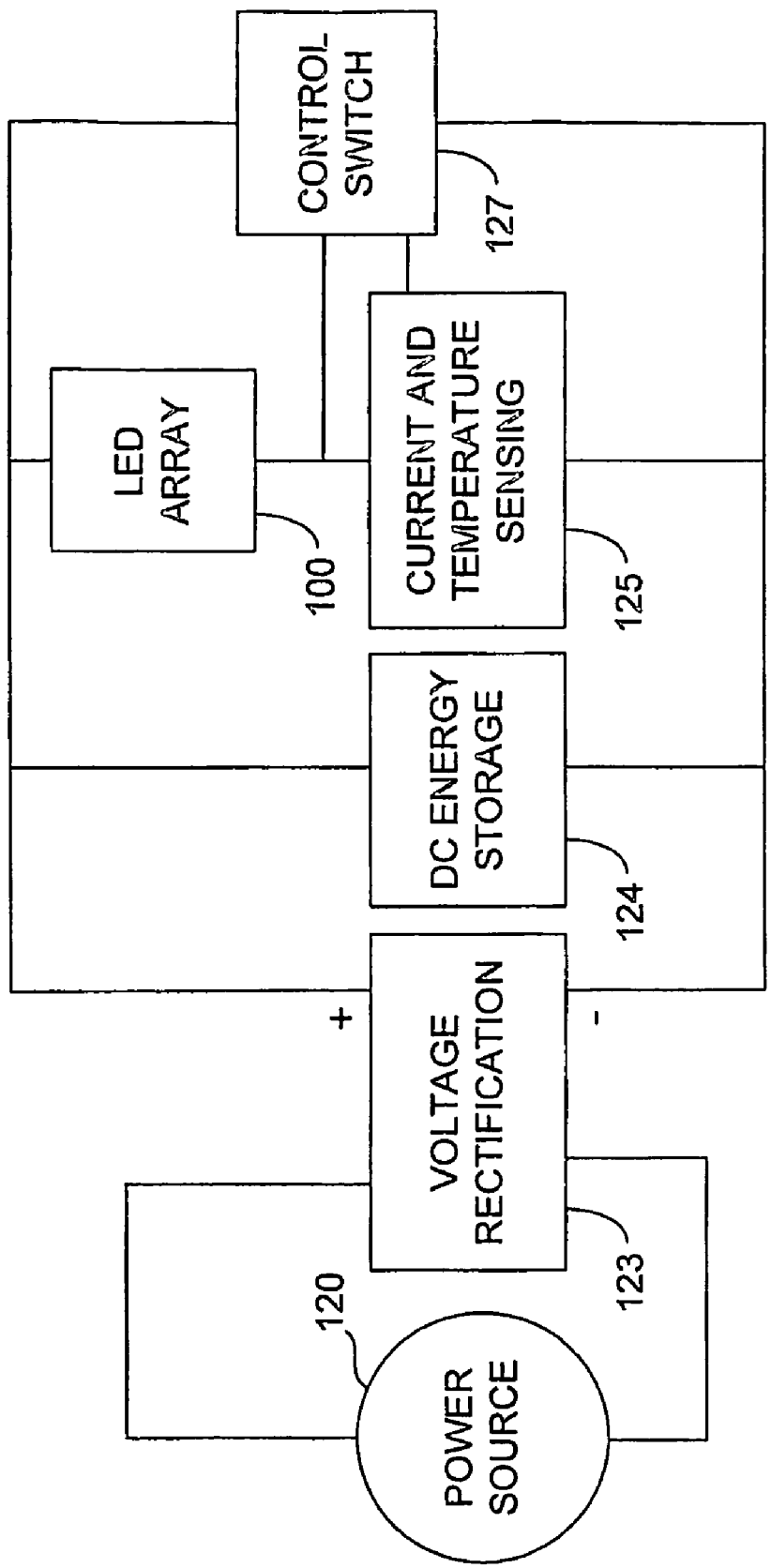
FIGS. 4A-4D are block diagrams that illustrate in general the main functional circuit components and sections found in a progression of embodiments of the invention.
Figure 4B:
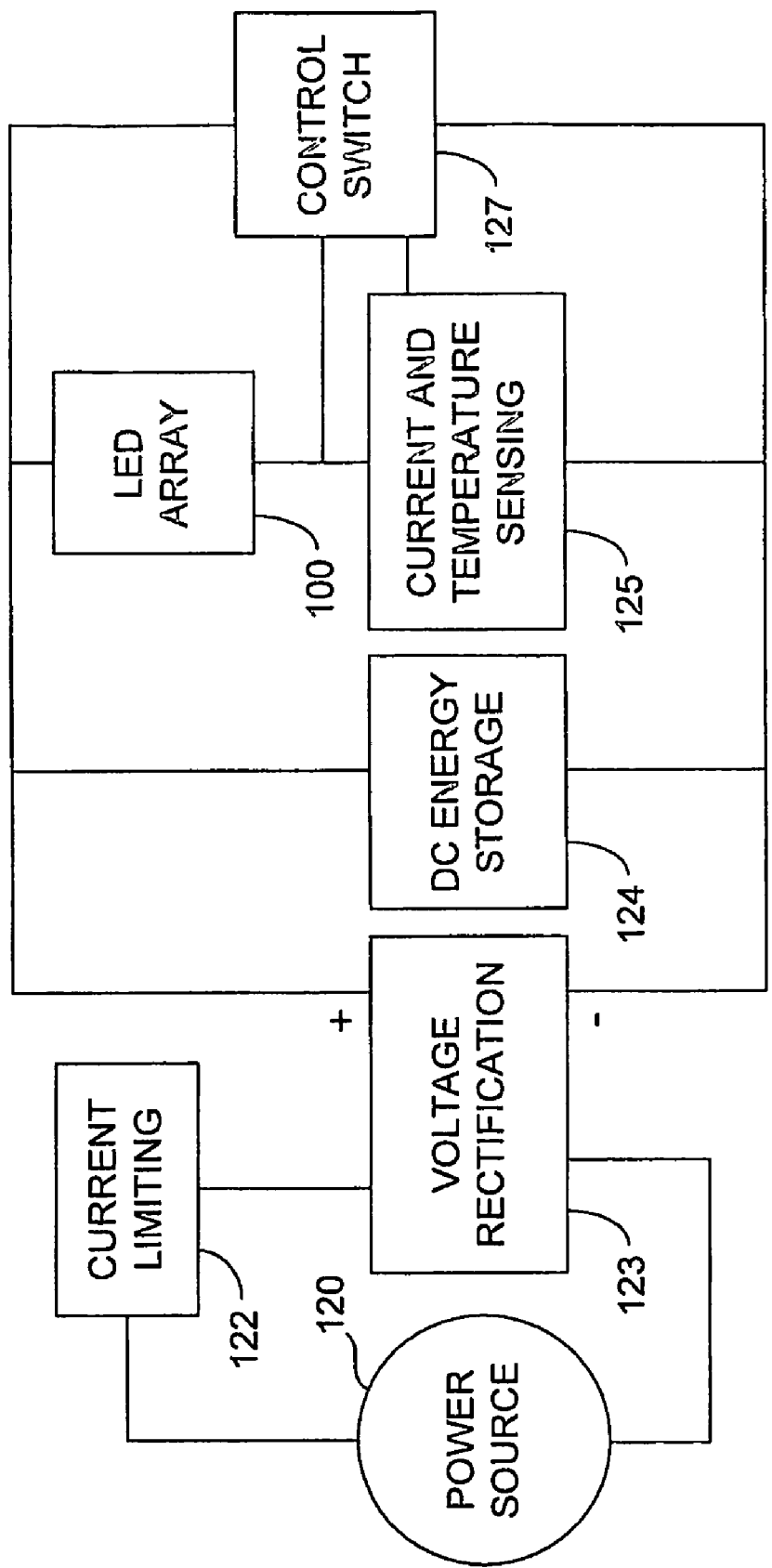
Figure 4C:
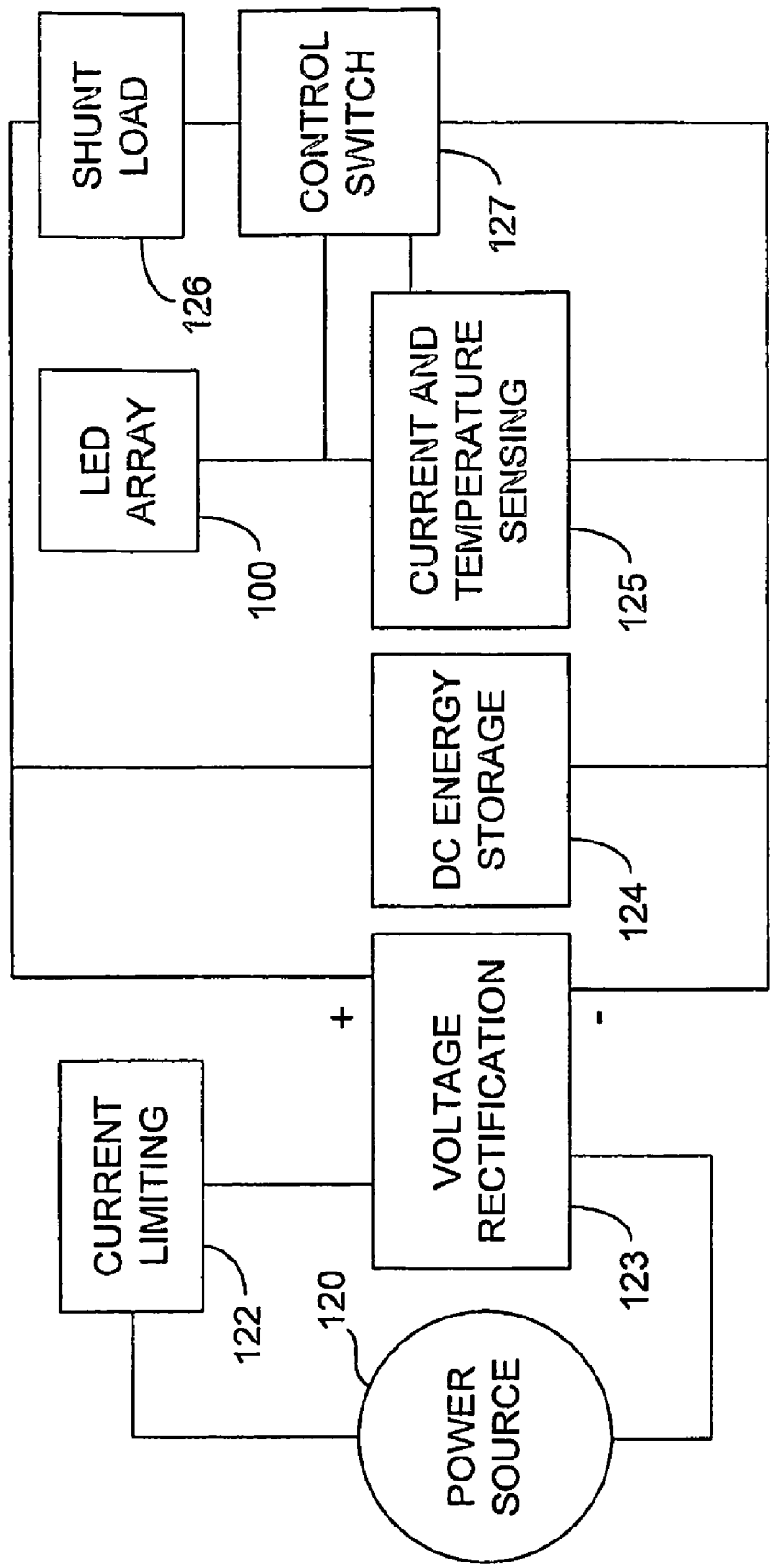
Figure 4D:
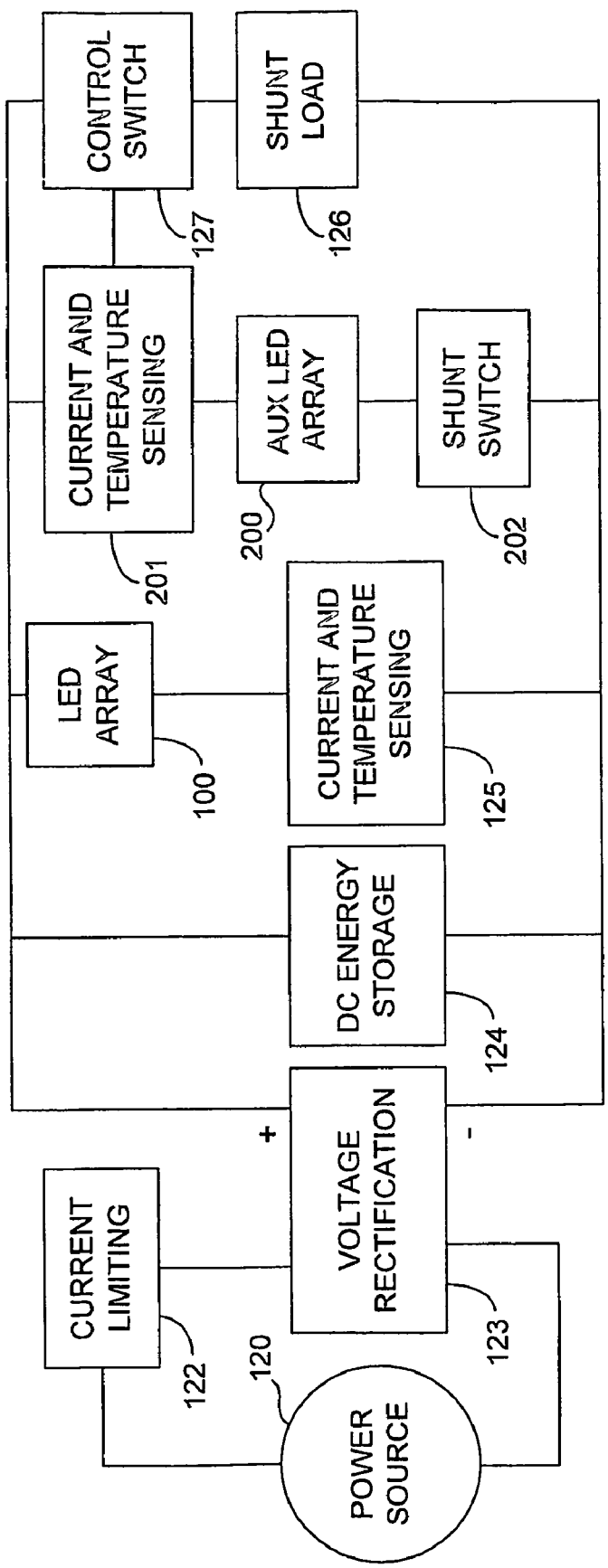

FIGS. 4A-4D are block diagrams of a progression of embodiments of the invention that use an AC power source 120 to drive at least the main LED array 100. The embodiment shown in FIG. 4A has, in addition to voltage rectification 123 and DC energy storage 124, the LED array 100 and current- and temperature sensing circuitry 125 in one current path and a control switch 127 in a parallel path; FIG. 4B adds current limiting 122 to the embodiment shown in FIG. 4A; FIG. 4C adds a shunt load 126 to the embodiment of FIG. 4B; and FIG. 4D shows an auxiliary LED array 200, along with additional current- and temperature sensing circuitry 201 and a shunt switch 202, in yet another parallel current path.

Various circuit implementations of the general block diagrams of FIGS. 4A-4D are described below. Moreover, yet other embodiments (such as direct-current embodiments) are also described that do without some of the components illustrated in FIGS. 4A-4D, that use a variety of component technologies and topologies, etc., are also disclosed.

Figure 5A:
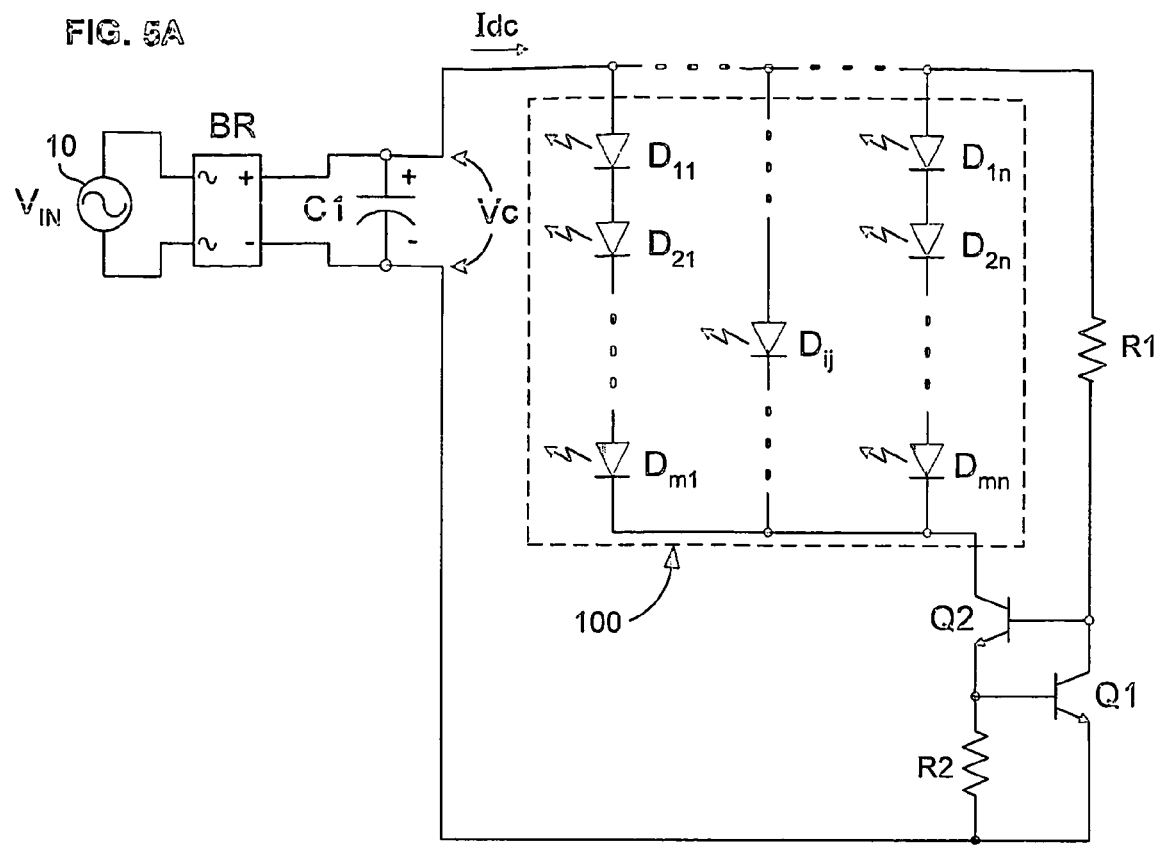
FIGS. 5A and 5B illustrates circuits, respectively without and with an AC line capacitor, for regulating the current through an LED array, in which regulation takes into account both temperature and current.

An embodiment of the circuitry of the invention is illustrated in FIG. 5A that is well suited for use either as an original lighting system or as a replacement for existing incandescent or fluorescent lighting systems. A bridge rectifier BR provides voltage rectification (which performs the function of block 123 in FIG. 4A); a DC capacitor C1 provides energy storage (block 124); resistors R2 and R1 are used as the current-sensing and temperature-sensing elements (block 125); and the NPN bipolar transistors Q1 and Q2 are used as the control switch (127).

Input power source voltage Vin is rectified by the bridge rectifier BR., that is, the bridge rectifier BR converts AC input source voltage into DC voltage. In implementations where the input voltage is DC, the rectifier may still be included to make the connection non-polarized.

The DC energy storage capacitor C1 maintains a sufficient level of energy to the LED array 100 when the source voltage is below a certain level and stores any excess energy when the source voltage is above a certain level. Capacitor C1 also absorbs any inrush of energy from the input power source and thus protects the LED array from damage.

The DC voltage Vc over the capacitor C1 creates a current Idc, which drives the LED array 100, which has n parallel paths, each having m series-connected LEDs $D_{1,1}, D_{2,1}, \ldots, D_{i,j}, \ldots, D_{m,n}$. In some of the drawings, for convenience, the LED array 100 is indicated collectively, without a symbol for each LED. In some applications, both m and n may be greater than one, but this is not necessary for either. To meet requirements for brightness (lumens) and area coverage as an aftermarket light bulb replacement (one advantageous application of the invention), the LED lighting system will preferably have both m and/or n greater than one, since one LED will usually not be bright enough for most applications other than simple indicators, and will not have a wide enough angle to cover an area needed to be illuminated, especially if this is about 360°.

For a given power source and for given colors of LEDs in the array, in order to optimize energy transfer to the LEDs, the number of LEDs that can be connected in series, that is, m, should be maximized while the variations of source voltage and variations of the LED forward voltages are addressed.

The current and temperature sensing elements R2 and R1, combined with the control switch Q1 and Q2, provide current and temperature feedback control for the LED array 100: Any increase in current and temperature through the LED array 100 from a set point will be detected by the current and temperature sensing elements R2 and R1, which will change the bias of Q1 and Q2, resulting in the increase of the collector-emitter voltage of Q2 and a decrease of current to the LED array 100. The invention as shown in FIG. 5A also works in the same manner where the voltage source is DC.

In parallel with the LED array 100 is a first shunt resistor R1, which is connected to the collector of a first transistor Q1, whose emitter is connected to a system ground. The first transistor Q1 forms a solid-state voltage reference source.

Current that passes through the LED array enters the collector of a second transistor Q2, whose emitter is connected to ground through a second resistor R2 and to the base of the first transistor Q1. The base of Q2 is connected to the collector of Q1, whose base is therefore also connected to the emitter of Q2. R1 provides biasing current to Q2 and Q1.

Using well known design methods, the capacitance of C1 is chosen so that the circuit delivers just enough average current and average voltage to the LED array 100 when the input source voltage is at its lowest expected extreme value (taking into account the variations) and the LED forward voltage is at its maximum. Too much capacitance would result in a too high average voltage Vc, which Q2 would have to absorb by raising its average collector-emitter voltage; this would lead to excessive heat that would need to be dissipated. Too little capacitance would result in a too low an average voltage Vc and would result in insufficient current to the LEDs, which would result in a under-performing LED lighting system.

One design formula for the capacitance C1 that may be used is:

$$C1 = Idc/(0.3*Vin)/(2*f)$$

where
Idc is the average current for the LED array (which will of course depend on the number of diodes in the array);

Vin is the nominal AC input source voltage at the bridge rectifier BR; and f is the line frequency of the AC input source voltage.

Q1 provides a voltage reference to R2 by its base-emitter voltage. A typical base-emitter voltage for silicon npn transistor is about 0.6 VDC; a smaller base-emitter voltage can be obtained by using germanium or other type bipolar transistors. The advantage of using a smaller voltage reference is that R2 then would dissipate less heat, which would result in an even more efficient system. The current through R2 is equal to Q1's base-emitter voltage divided by R2.

Q1 provides feedback and regulates Q2's emitter current by way of biasing Q2's base voltage.

Q2 provides the current path for the LED array 100 and addresses the variation of LED forward voltages by varying its collector-emitter voltage while trying to maintain the collector current as close to its emitter current as possible.

R2 and the voltage reference transistor Q1's base-emitter voltage determine the total current going into the LED array 100. For ensample, if there are eight parallel branches of LEDs (n=8) in the LED array, each drawing 24 mA, the total current is 192 mA. The value of R2 would be 3.125 Ohm, given a Q1 base-emitter voltage of 0.6 V.

Figure 6:
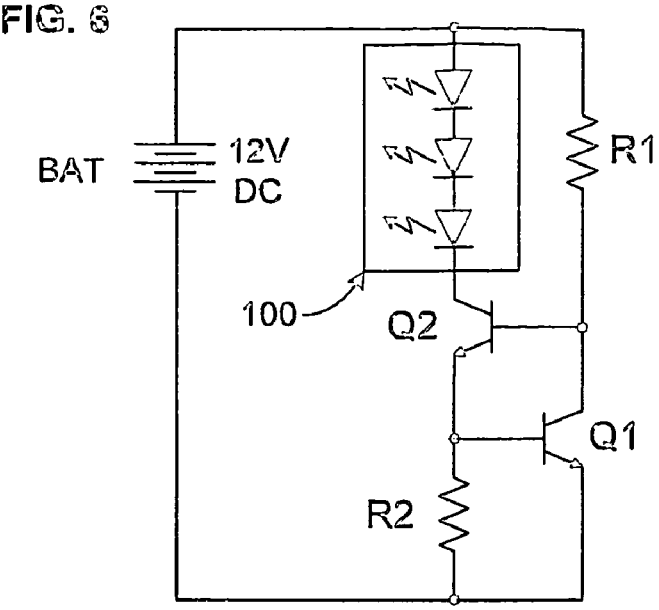
FIG. 6 is a circuit diagram of an embodiment of the invention in which an LED array is powered by a direct current (DC) source such as a battery.

FIG. 6 illustrates another possibility, in which the AC voltage source, the rectifier BR and the capacitor C1 are replaced by a battery BAT. Note that the capacitor C1 is not needed because the battery itself acts as a DC capacitor, at least when it is charged. In FIG. 6, a simplified array 100 of three LEDs in a single branch (m=3, n=1) is also shown by way of illustration only.

In the embodiments illustrated in FIGS. 5A, 5B and 6 (as well as others described below), Q1 and Q2 are bipolar, of the NPN-type implemented as a low side switch, since they are connected to the system ground side. Other configurations and types are also possible. FIGS. 7A-7D illustrate, for example, not only the bipolar, NPNI implementation (FIG. 7A), but also slightly modified circuitry for use with bipolar PNP transistors as a high side switch (FIG. 7B), as well as with Q2 implemented using N-type and P-type metal oxide semiconductor field effect transistors (MOSFETs) both as low and high side switches respectively. In FIGS. 7A-7D, the voltage source and rectifier (or, DC source, if provided) have been omitted for simplicity, although the connection points to the rectifier are indicated as terminating circles. Moreover, the component designations R1, R2, C1, Q1, and Q2 are retained in the different drawings, even where, for example, the type of transistor may be different or additional components are included, simply for the sake of simplicity and ease of comparison, and also because, regardless of type or value, these components perform the same general functions in the different configurations.

Current Sensing, Temperature Compensation/Thermal Shutdown

A typical current-sensing element could be a resistor (such as R1 and/or R2) or other components such as a Hall effect sensor. As an optional alternative, R1 could be replaced by either a temperature-sensitive device such as a positive temperature coefficient resistor (thermistor), a temperature compensation circuit, or a temperature-dependent circuit or device, to provide temperature compensation and/or thermal shutdown for the LED lighting system: As the temperature increases to above a threshold set point, the device or circuit will start to choke off biasing current to both Q1 and Q2, thereby reducing the LED array's nominal current. Further increase in temperature will lead to total cut-off of biasing current to Q1 and Q2, which will in turn cause the LED lighting system to shut off.

R2 is preferably implemented using a high positive-temperature coefficient type resistor, such as a wire-wound type resistor, which will act as a built-in temperature-compensation circuit in the system: As temperature increases, the resistance of R2 would increase, which will cause the current going to LED array 100 to decrease.

12VDC System Example

The following example illustrates the advantages of the "constant energy" approach according to the aspect of the invention just described, as well as the drawbacks of the conventional resistor-based approach.

Assume that an array of 24 (m=3, n=8) super-bright white LED is driven by a 12V DC automobile battery system, with a nominal current for the LEDs of 24 mA. Measurements were taken in a configuration according to the invention, that is, the constant LED energy transfer approach, and in a system that used the conventional current-limiting resistor. Tables 1-3 below give the results of a comparison of the two 12VDC LED lighting systems, namely the "constant energy" approach according to this aspect invention versus a typical resistor-based circuit as described above:

TABLE 1

Branch current as a function of Input Voltage

| Input voltage Voltage (VDC) | Constant-Energy Approach | | Resistor-Based Approach | |
|---|---|---|---|---|
| | Per-branch current (DC mA) | Total current (DC mA) | 56 Ohm per-branch current (DC mA) | Total current (DC mA) |
| 11.0 | 21 | 171 | 18 | 61 |
| 11.5 | 24 | 191 | 11 | 85 |
| 12.0 | 24 | 191 | 15 | 120 |
| 12.5 | 24 | 191 | 19 | 155 |
| 13.0 | 24 | 192 | 24 | 194 |
| 13.5 | 24 | 192 | 32 | 253 |
| 14.0 | 24 | 192 | 38 | 304 |
| 14.5 | 24 | 193 | 44 | 349 |

TABLE 2

Power as function of input voltage
(Constant-energy approach according to the invention)
Constant-Energy Approach

| Input voltage (VDC) | Input power (mW) | Power to Regulator (mW) | Power to LEDs (mW) |
|---|---|---|---|
| 11.0 | 1883 | 86 | 1798 |
| 11.5 | 2193 | 191 | 2003 |
| 12.0 | 2293 | 287 | 2007 |
| 12.5 | 2393 | 383 | 2010 |
| 13.0 | 2493 | 479 | 2013 |
| 13.5 | 2592 | 576 | 2016 |
| 14.0 | 2688 | 672 | 2016 |
| 14.5 | 2796 | 771 | 2024 |

TABLE 3

Power as function of input voltage
(Resistor-based approach according to the prior art)
Resistor-Based Approach

| Input voltage (VDC) | Input power (mW) | Power to Regulator (mW) | Power to LEDs |
|---|---|---|---|
| 11.0 | 666 | 26 | 640 |
| 11.5 | 982 | 51 | 931 |
| 12.0 | 1439 | 101 | 1338 |
| 12.5 | 1940 | 169 | 1771 |

TABLE 3-continued

Power as function of input voltage
(Resistor-based approach according to the prior art)
Resistor-Based Approach

| Input voltage (VDC) | Input power (mW) | Power to Regulator (mW) | Power to LEDs |
|---|---|---|---|
| 13.0 | 2527 | 265 | 2263 |
| 13.5 | 3413 | 447 | 2965 |
| 14.0 | 4256 | 647 | 3609 |
| 14.5 | 5058 | 852 | 4206 |

Like super-bright blue LEDs, the forward voltages of super-bright white LEDs typically vary between 3.0VDC to 3.5VDC. The output voltages of the 12 VDC system typically vary between 11VDC to 15VDC. Therefore, the maximum number of super-bright LEDs (m) that can be connected in series is three.

As the tables show, in the conventional resistor-based approach, at low input voltages, the LED lighting system under-performed, such that the LEDs were not giving out enough light. At high input voltages, the LED lighting system over-performed, such that the LEDs were operating outside their safe operating regions. Using the constant energy approach of this invention, however, the LEDs performed at their designed level throughout the variation of input voltages.

The resistor-based approach operates at a pivot-designed point as such the LEDs' current varies proportionally with input voltage. In the particular design tested, the pivot point was 12.8 VDC, where, typically, a 12 VDC battery is fully charged. As the input voltages increase above this point, the current continues to increase—this is the very situation that should be avoided since excess energy goes into the LEDs and its peripheral lossy components only generate excessive heat and cause the LEDs to operate outside their safe operating regions.

In particular, at 14.5VDC, total wattage going into the constant energy configuration of this invention was about 2.8 W whereas for the resistor-based approach it was about 5.1 W. In other words, the prior art used 82% more power than the invention. When the input voltage changed from 13 VDC to 14 VDC, the power intake to the system according to the invention increased by only 8%, which was absorbed by the constant energy circuit while power increase to the LEDs was essential nil. In contrast, in the resistor-based approach, the power intake to the system increased by 68% and power transfer to LEDs increased by a full 60%, which would certainly cause the LEDs to operate outside their safe operation regions. In the resistor-based approach, at 14.5 VDC, power transfer to LEDs increased to 85% of its nominal designed value.

12VAC System

The "relative constant energy" approach according to the invention is even more advantageous when applied to 12VAC (as opposed to 12 VDC) systems, since one can use only three white LEDs in series in the conventional resistor-based approach while one can use four white LEDs in series in the constant energy approach: Assuming standard components, normal calculations can be used to show that the constant energy approach of the invention is many times better than the resistor-based approach when it comes to handling voltage source variation and LED forward voltage variation (robustness), and also in terms of net energy transferred to LEDs and total energy wasted as heat (efficiency).

The voltage overhead needed for this circuit is the sum of the base-emitter voltage of Q1 and collector-emitter voltage of Q2, which are about 0.6 VDC and 0.20 VDC, respectively. This voltage overhead can be reduced further, thereby wasting less energy, by using germanium type transistors for Q1, which have lower base-emitter voltages.

Figure 8:
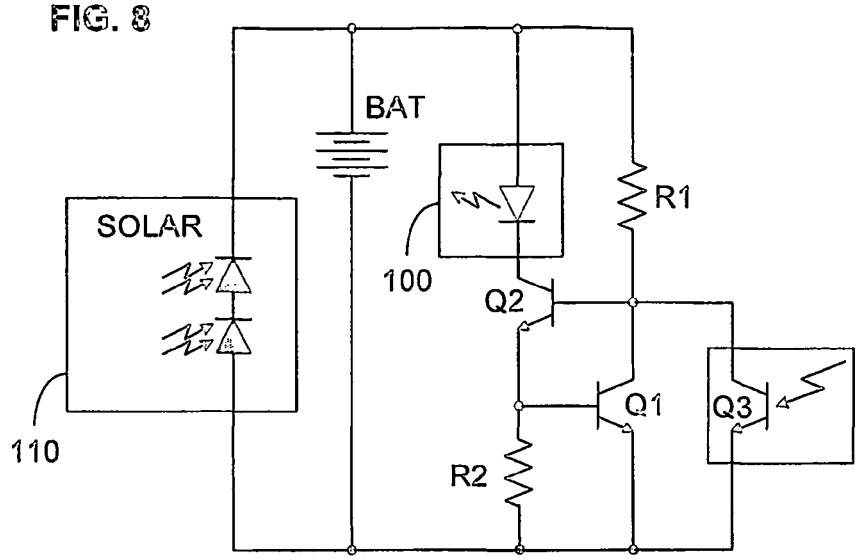
FIG. 8 illustrates an embodiment of the invention in which the lighting system is powered not only by a DC source, but also by a current-generating source such as a solar panel.

FIG. 8 illustrates an application of the invention in which voltage is supplied not only from a battery BAT, but also, in parallel, by an array of light-sensitive elements, such as a solar panel 110. A light-activated transistor Q3 (or similar arrangement) shunts the Q1 collector to ground when the light shining on Q3's base is sufficient. Q3 thus operates as a light-activated, solid-state on-off switch for the LED array 100. The battery BAT is preferably rechargeable, so that when the sun (or other light) is shining, current will not flow through the array 100, but will instead be used to charge the battery BAT. At night, the battery will supply current to the array, which will give light, since the transistor Q3 will not be conductive. As its function indicates, this arrangement will be useful in any application that is to provide self-activated illumination in the dark but that is also self-charging. The use of this invention in this type of system is particularly advantageous as typically the energy storage is relatively small and the energy-generating element has relatively limited capacity due to space and economic reasons. Without the use of this invention the resulting LED light system would over-perform when the energy storage is close to its peak and under-perform when the energy storage is off its peak. This invention thus could also prolong the day-to-day hours of service of such an LED lighting system.

Figure 9:
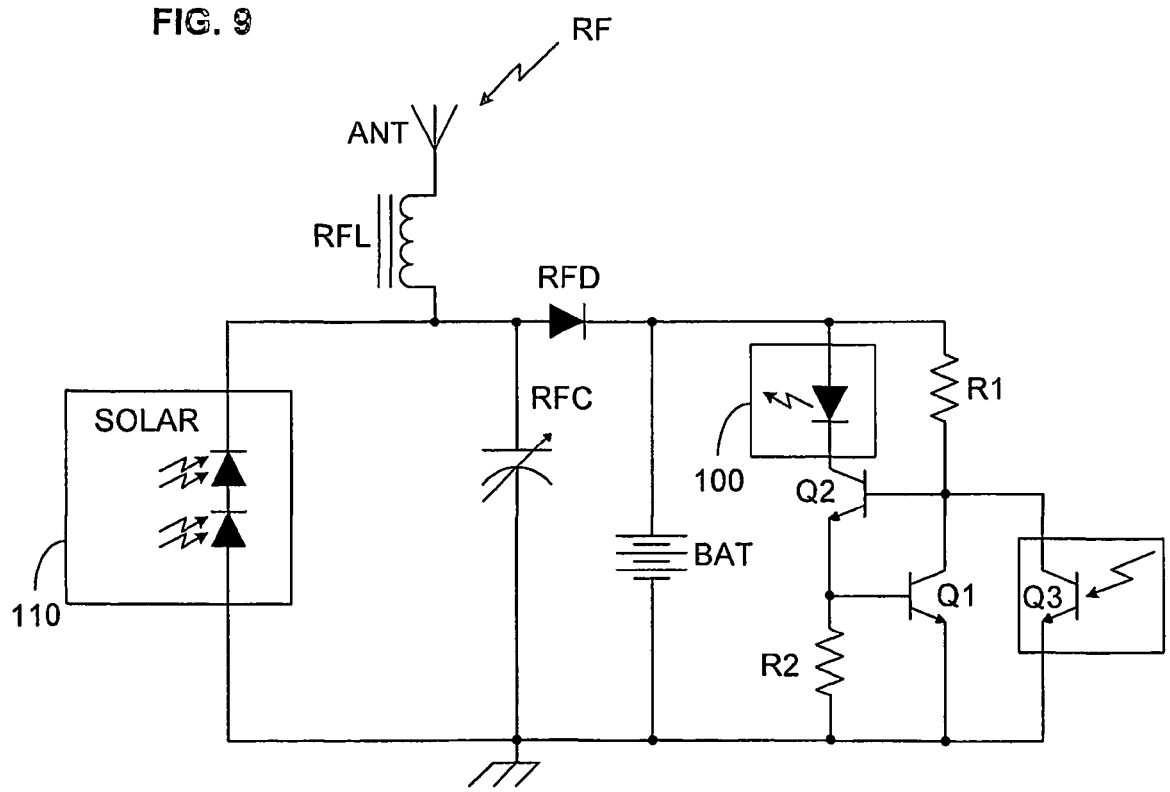
FIG. 9 illustrates an embodiment of the invention in which, in addition to a DC source and a solar panel, current used by the LED array is drawn from ambient radio-frequency energy.

FIG. 9 illustrates yet another alternative use of the invention, which is an extension of the embodiment shown in FIG. 8: In addition to (or instead on the solar panel 110, a tunable circuit is included to charge the battery BAT using ambient radio-frequency (RF) energy. Thus, an antenna ANT is connected to ground via a parallel-coupled RF coil RFL and a tunable capacitor RFC. The antenna, the coil RFL and the capacitor RFC form a wide-band tunable RF resonant circuit. The antenna RF is also connected to the battery BAT via an RF diode RFD, such as a D200 diode.

By tuning the capacitor RFC to, for example, the frequency band of a common cellular telephone network, current would be applied to the battery BAT (and also to the array itself) even absent the solar panel 110. Since such networks generally operate regardless of the weather or time of day, the energy drawn in by the antenna and the RF coil would even help reduce drain on the battery at night. This embodiment of the invention is particularly useful where regular power line wiring to the circuit is impractical and/or the circuit is housed in a sealed environment such as in embedded indicators used to divide highway lanes.

The embodiment shown in FIG. 9 can be made as a totally sealed system by housing it in a clear casing to allow light to the solar cells in the panel 110 and to the phototransistor switch Q3. Initially, the battery BAT (preferably a long-life lithium battery with low internal resistance) is fully charged. During daylight hours, the solar panel 110 will maintain the charge of the battery and will also bias the RF capacitor with a DC voltage so that incoming RF energy will have a lower DC threshold point to turn on the RF diode RFD, which is preferably a germanium-type element; this provides a higher RF energy transfer rate.

The RF energy capture embodiment of the invention shown in FIG. 9 could also be used in movable applications, such as on vehicles or even as a device that can be carried or worn by people.

Alternatives for Line Voltage Applications

Several of the illustrated embodiments of the invention include a current-limiting component or circuit (block 122 in FIGS. 4B-4D) between the power source and the voltage rectifier 123. These render the respective embodiments particularly well-suited for use in AC line voltage applications.

Figure 5B:
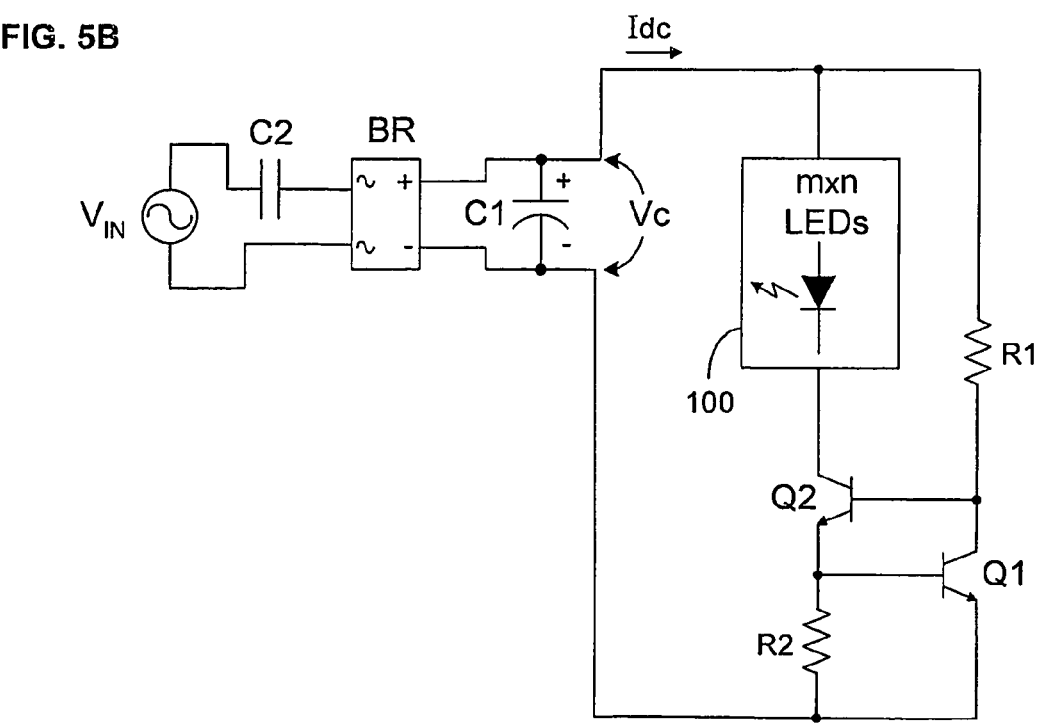

As a circuit example of this, note that, unlike FIG. 5A, FIG. 5B shows, between the voltage source and the bridge BR, an AC capacitor C2, which provides current-limiting (FIG. 4B, block 122) for the input line voltage. Except for the absence of C2, the components shown in FIG. 5A also serve the functions of the similarly labeled elements of FIG. 5B.

The current-limiting capacitor C2, in series with the AC input line voltage VIN, effectively forms an AC current source, which limits the peak and hence the average current to the system, at the same time taking up some of the line voltage from Q2. This helps Q2 to regulate the LED array 100 current without taking up too much of the line voltage, that is, it results in a smaller Q2 collector-emitter voltage for the line voltage applications.

Using well known design methods, the capacitance of C2 is chosen so that the circuit delivers just enough average current to the LED array 100 when the input source voltage is at its lowest expected extreme value (taking into account the variations) and the LED forward voltage is at its maximum. Too much capacitance would result in high voltage that Q2 would have to absorb by raising its collector-emitter voltage; this would lead to excessive heat that would need to be dissipated. Too little capacitance would result in a too low average source current and would result in insufficient current to the LEDs, which would result in a under-performing LED lighting system.

One design formula for the capacitance C2 that may be used is:

$$C2 = Idc/(Vin * 2 * \pi f)$$

where

Idc is the average current for the LED array (which will of course depend on the number of diodes in the array 100);

Vin is the lowest nominal AC input source voltage at the bridge rectifier BR; and f is the line frequency of the AC input source voltage.

Embodiment with Single-Switching Element

Figure 10:
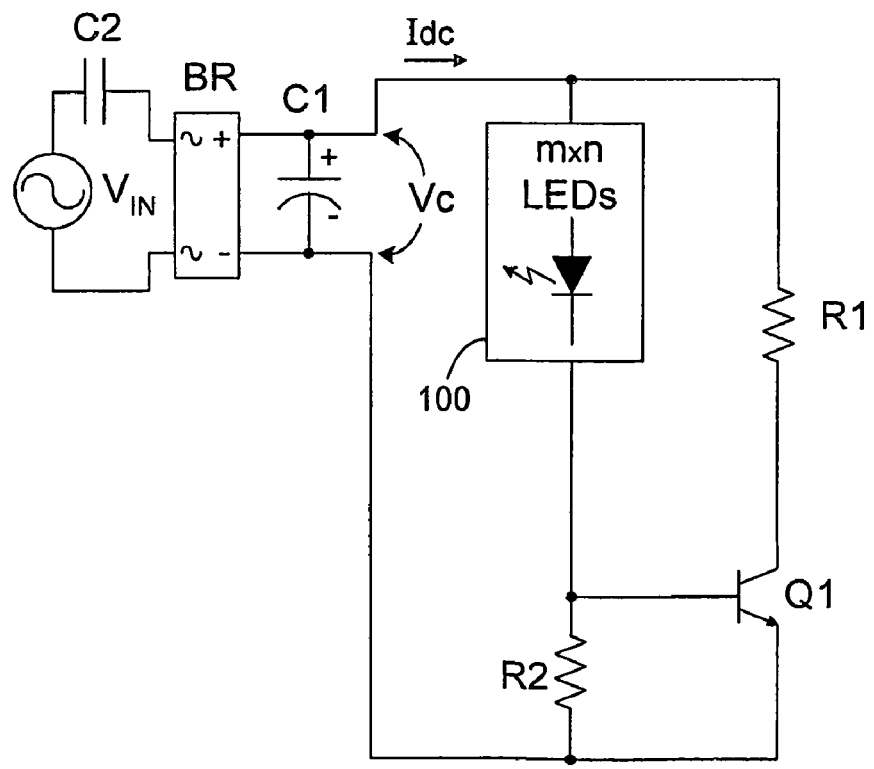
FIG. 10 illustrates an embodiment of the invention in which a shunt load is used to accept overflow current that is regulated away from the main LED array.

An embodiment of the circuitry of the invention is illustrated in FIG. 10 that is similar to the circuit of FIG. 5B except for the removal of Q2. The shunt load R1 and the shunt switch Q1 maintain a desired level of currents through the LED array as well as the capacitor C2. This results in an optimized performance of the LED array independent of the variation of line voltage and component parameter variations. The current and temperature sensing element R2, combined with the shunt switch Q1, provide current and temperature feedback control of the LED array: Any increase in current and temperature through the LED array 100 will be detected by the current and temperature sensing element R2, which will signal the shunt switch Q1 to increase the current through the shunt load. The increased current through the shunt load will prevent the current and temperature from increasing further in the LED array.

At the positive and negative peaks of the AC line voltage, the charge on capacitor C1 reaches its peaks. The resulting higher voltage will attempt to push more current through the LED array 100. At this point, however, the shunt switch Q1 will turn on fully, putting the shunt load R1 in parallel with the LED array 100, thereby shunting current away from the LED array 100. In between line voltage peaks, capacitor C1 will steadily discharge, decreasing the voltage across the LED array. The shunt switch Q1 will be fully turned off when the LED array 100 current drops to a certain level. This process, i.e., the turning on and off of the shunt switch Q1, determines and regulates an average current going into the LED array 100. The current drawn by the shunt load also maintains a level of load current needed by the capacitor C2 to maintain a low voltage level across the bridge rectifier BR especially when the input line voltage is at its peaks; hence, a much lower voltage than the line voltage results at the output of the BR and across C1.

Using well known design methods, the values of resistors R1 and R2 may be chosen so that the circuit delivers just enough average current and average voltage to the LED array 100 when the nominal line voltage is at its lowest expected extreme value (taking into account the variations) and the LED forward voltage is at its maximum. The design values of C1 and C2 are the same as before. The example given above with reference to FIGS. 5A and 5B may be applied here as well: assuming eight parallel branches of LEDs (n=8) in the LED array, each drawing 24 mA, and given a Q1 base-emitter voltage of 0.6 V, the total current is 192 mA, so that the value of R2 would be 3.125 Ohm. The shunt load R1 should draw about the same current as the LED array 100 when the shunt switch Q1 is fully turned on. Skilled electrical engineers will readily know how to determine suitable values for R1 and R2 given the supply voltage and the array 100 load.

Shunt Load(s)

A typical shunt load could be a resistor, such as R1 in the embodiments of the invention described above. Other components can also be used, for example, an additional energy storage element such as a capacitor with additional energy recovery circuitry, to further increase the efficiency of the system. A further improvement of efficiency can be achieved by employing another LED array as the shunt load.

Figure 11A:
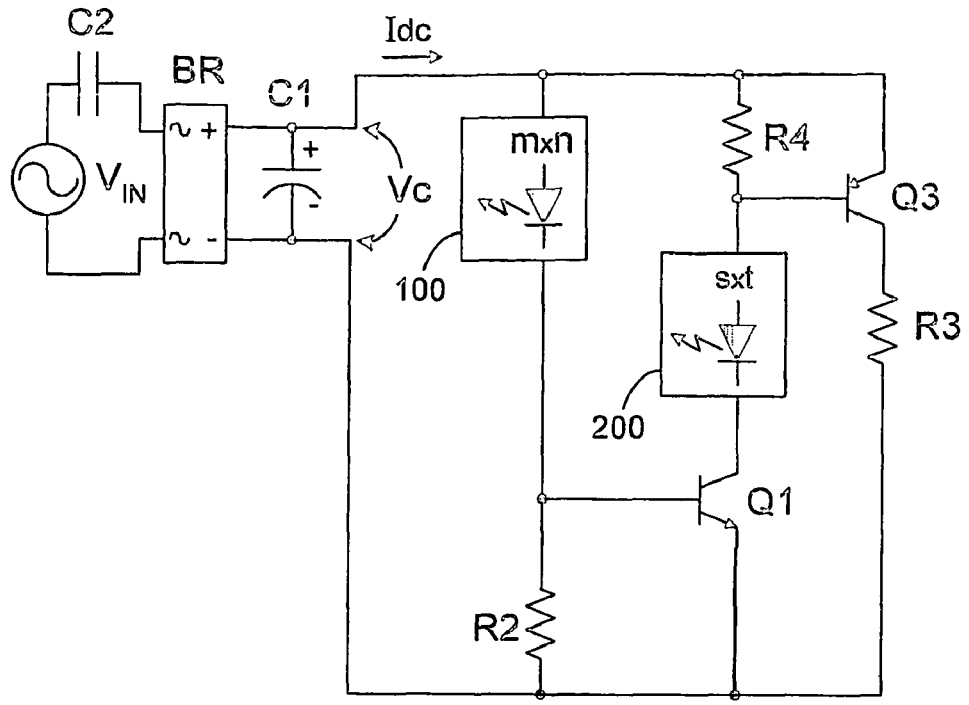
FIG. 11A illustrates an embodiment of the invention that includes a secondary LED array in addition to the main LED array and shunt load.

FIG. 11A illustrates the circuitry of such an embodiment of the invention, in which the auxiliary LED array 200 has s-by-t LEDs, where, as with array 100, s and t may be independently chosen to be any positive integers. The value s is preferably chosen to be less than m (the number of series-connected LEDs in each branch of the primary array 100) so that the turn-on voltage of the LED array 200 shunt load is lower than that of the LED array 100 to ensure proper shunting function. By shunting overflow current through the secondary, auxiliary LED array 200, the overall energy transfer rate to the LED lighting system is increased, since even overflow current will be used to generate additional light. Although not necessary, the LEDs in both arrays 100 and 200 may be mounted on a common base, possibly with the LEDs intermixed, so that any activation of the LEDs in the secondary array 200 will not be noticeable in any one place, and will thus be less distracting.

At the low input voltage range, all current flows through the main LED array 100. At high end of the input voltage range at which Q1 becomes conductive, current will flow through both the main LED array 100 and the secondary LED array 200. At the peak of the input voltage range, should Q3 become conductive, any excess current from array 200 will be diverted into the shunt load R3.

The configuration shown in FIG. 11A establishes three voltage ranges: In a primary range, most or all current passes through the primary array 100. Above a first threshold, when the voltage is in an intermediate range and close to the peak range, current will pass through both the primary array 100 and the secondary array 200. Above a second voltage threshold, current will be allowed to pass through both arrays 100, 200, as well as through the shunt load R3 if needed. Thus, overflow current is directed though the secondary array, but is used for additional illumination, whereas excess current is simply shunted to ground through the load R3. The voltages at which the switching occurs will depend on the chosen switching elements Q1, Q3 and the chosen resistor values R2, R4, as well as on other choices such as the number of LEDs in the arrays, the values of the capacitors C1 and C2, and, of course, the maximum voltage value that Vc reaches.

In the embodiment of the invention illustrated in FIG. 11A, the average currents flowing through both the main LED array 100 and the auxiliary LED array 200 are regulated by limiting the peak currents. The average current into the shunt load is relatively small compared to the main and auxiliary LED array currents. Variation of input source voltage, LED forward bias voltage, and capacitance value will typically have little effect on the main LED array's average current, although this variation will have some effect on the average current into the auxiliary LED array 200 and the shunt load R3.

Skilled electrical engineers will readily know how to determine suitable values for R2, R3, R4, Q1 and Q3 given the supply voltage specifications, the array 100 load, and the array 200 load: Even in this more complicated embodiment, the general design considerations indicated above may be applied to determine suitable values. Again, R2 and the voltage reference transistor Q1's base-emitter voltage determine the total current going into the LED array 100. Using the same assumptions as above, namely eight parallel branches of LEDs array, each drawing 24 mA, the total current would be 192 mA and R2 would be 3.125 Ohm, given a Q1 base-emitter voltage of 0.6 V. R4 and the voltage reference transistor Q3's base-emitter voltage determine the total current going into the LED array 200. Given a total current of 192 mA, the R4 would be 3.125 Ohm, assuming a Q3 base-emitter voltage of 0.6 V. The shunt load R3 should draw about the same current as the LED array 200 when the shunt switch Q3 is fully turned on; again, skilled electrical engineers will readily know how to determine suitable values for R3 given the supply voltage and the array 200 load.

Alternative Switch Configurations

Figure 11B:
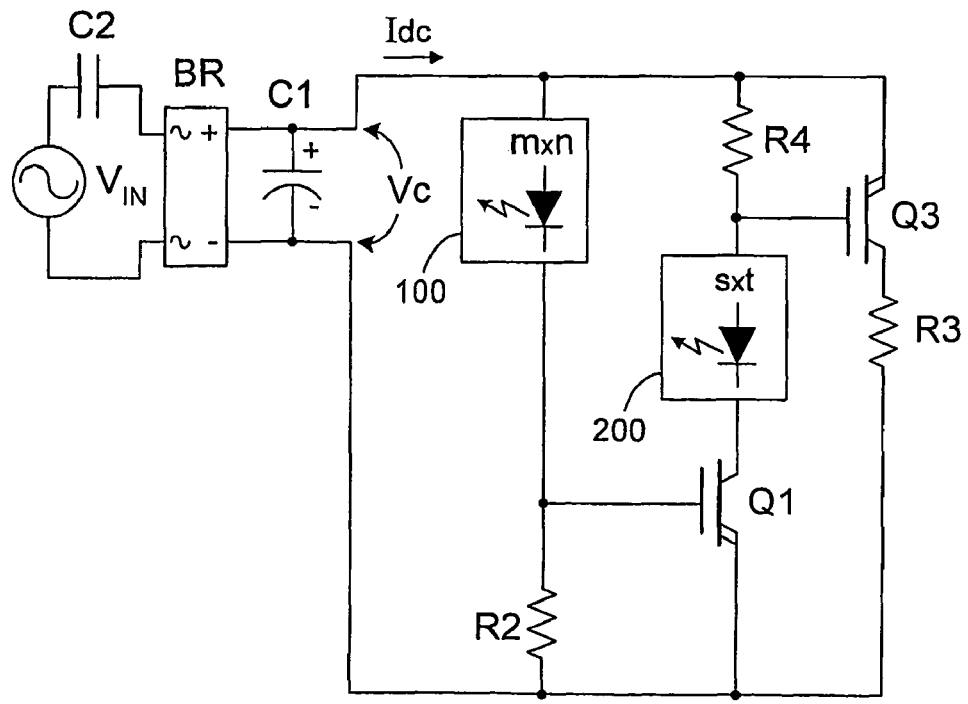
FIG. 11B illustrates a MOSFET switch implementation of the embodiment of the invention shown in FIG. 11A.

In the embodiments illustrated in FIGS. 5A, 5B, 10, and 11A, the switches are the bipolar transistors Q1, Q2 of the NPN type and Q3 of the PNP type, with Q1, Q2 being implemented as a low-side switch (connected to the system ground) and Q3 being implemented as a high-side switch (connected to the system high point). Other types and configurations are also possible, as illustrated in FIGS. 7A-7D, which show how N-type or P-type field effect transistors (FETs), or N-type or P-type metal oxide semiconductor field effect transistors (MOSFETs) can be used in place of NPN type or PNP type switches respectively. For example, the NPN and PNP bipolar transistors implementation in FIG. 11A can be changed to N-type and P-type FET as illustrated in FIG. 11B.

Figure 7A:
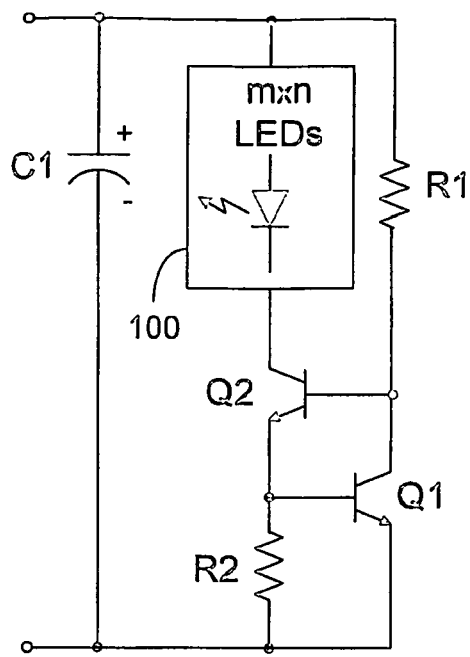
FIGS. 7A-7D illustrate circuits analogous to portions of those shown in FIGS. 5A and 5B but with different types of switching elements.
Figure 7B:
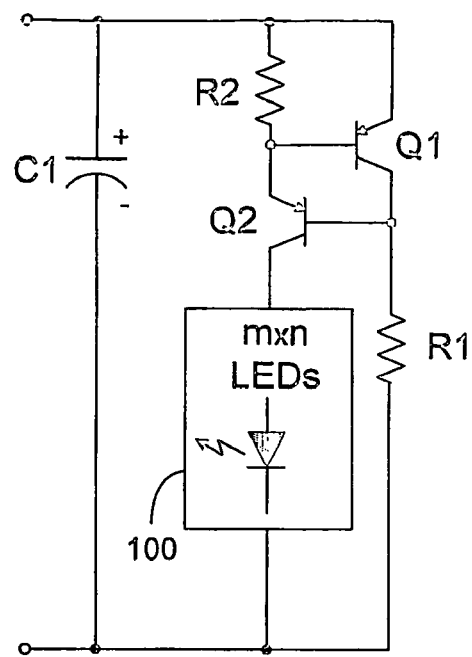
Figure 7C:
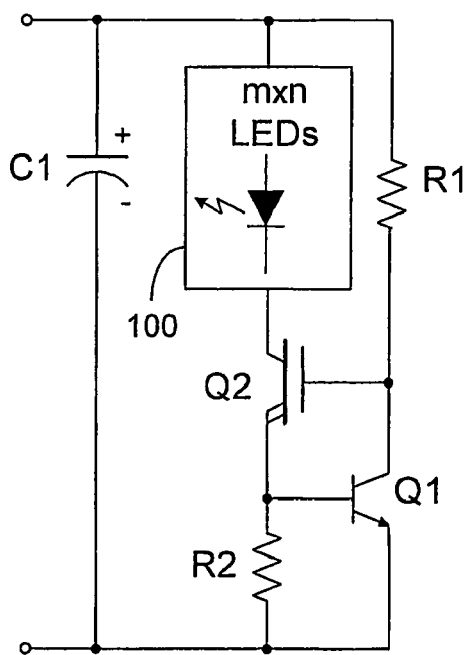
Figure 7D:
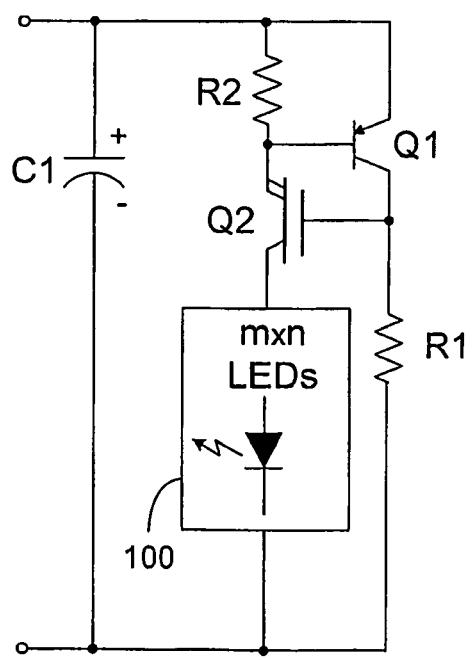
Figure 12A:
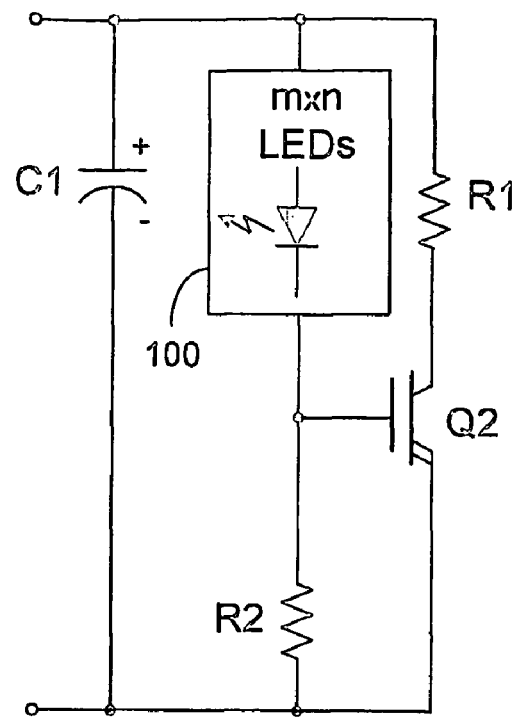
FIGS. 12A and 12B illustrate yet another technology that may be used to implement the switches in the various embodiments of the invention.
Figure 12B:
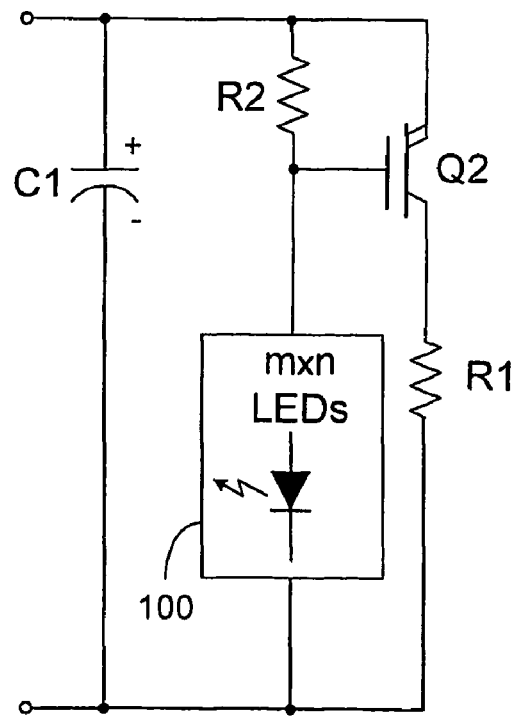

Furthermore, note that a low-side switch can be changed to a high-side switch by changing the topology and N-type to P-type switch as illustrated in FIGS. 7A and 7B. Similarly, a high-side switch can be changed to low side switch. The shunt switch can also be implemented using N-type and P-type metal oxide semiconductor field effect transistors, as illustrated in FIGS. 12A and 12B respectively. In short, the type and topology of the switches may be changed according to the needs or even simply preferences for a particular implementation of the invention without departing from the scope of the invention as such.

Mounting for Wide-Range Illumination

Figure 13:
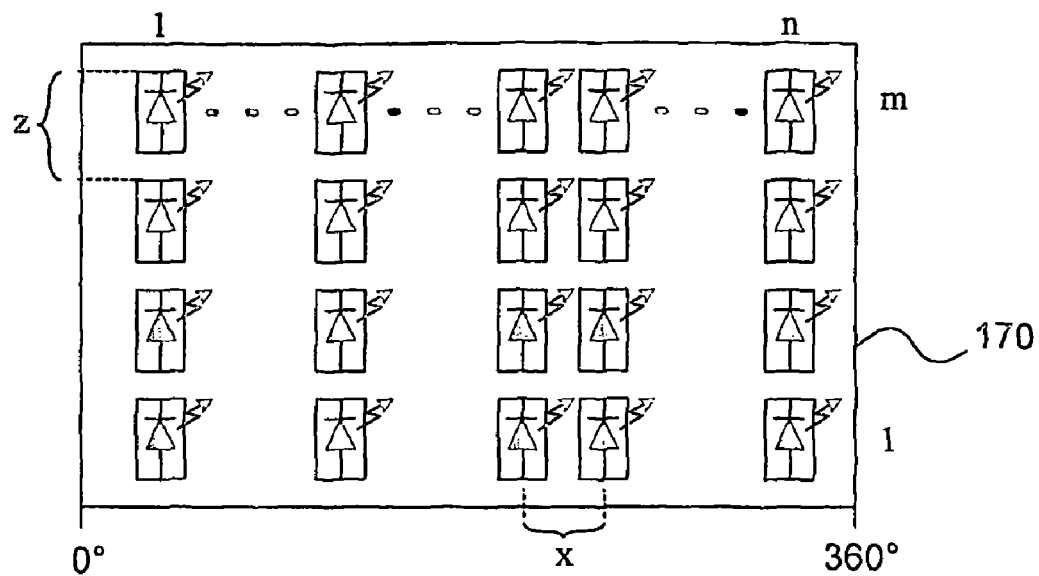
FIGS. 13 and 14 illustrate an arrangement for mounting the LEDs in the array(s) so as to provide wide- or even omni-range illumination.
Figure 14:
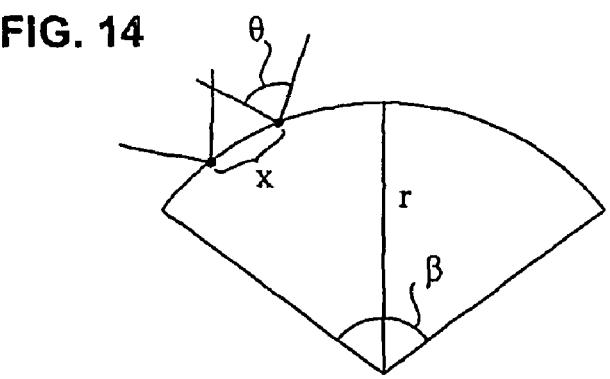

FIGS. 13 and 14 illustrate one way to mount the m-by-n LED array 100 and/or the s-by-t LED array 200 so as to provide for a range of illumination, even up to 360°, so as to render the device better suited as an after-market replacement for existing light bulbs. In this embodiment, the LED array is mounted and electrically connected, using known methods, on a base 170, which may be of a flexible material such as Mylar. FIG. 13 shows a four-by-n LED array, with a separation of z distance units in the direction of serial connection and a parallel pitch of x distance units.

The base 170 may be formed as a cylinder, or as any angular portion of a cylinder (or other curved shape, of course, depending on the visual effect to be created). In order to provide the impression of unbroken illumination—with no visible "gaps"—the formula for mounting distance z is:

$$z = 2d \tan(\tfrac{1}{2}\theta)$$

where
  d is the minimum distance required for overlapping of light beam; and
  $\theta$ is the LED viewing angle.

The formula for mounting distance x is:

$$x = (r\beta)/n$$

where
  r is the radius of curvature of the fixture;
  $\beta$ is the angle of coverage of the fixture; and
  n=integer($\beta/\theta$)+1

If x is larger than z then the value of z should be used.

It is not necessary for the base to be partly or wholly cylindrical; rather, the base can be manufactured or formed into any necessary shape using known methods. For example, the base could be shaped to be substantially spherical or "pear-shaped" so as to better resemble a standard incandescent light bulb. If the invention is to be used to replace an existing light bulb, then the base 170 should be provided with conventional contacts so as to connect the circuit to the given voltage supply. The circuit should also be provided with some outer shell not only to protect it, but also to better imitate the appearance of the light bulb being replaced.

What is claimed is:

1. A lighting system comprising:
   an array (100) of at least one light-emitting solid-state element, and a voltage source (10) that energizes the array,
   array state circuitry (125; Q2, R2), electrically connected in series with the array (100) and sensing at least one state of the array;
   secondary circuitry (127; R1, Q1; 200, 201, 202; 200, R4, Q1; 126, 127) connected in parallel with the array (100);
   a switching component (Q1; Q1, Q3; 202) adjusting the current passing through the secondary circuitry in accordance with the sensed state of the array such that current through the array is maintained substantially constant;
   a load, included in the secondary circuitry, through which passes overflow current shunted from the array by the array state circuitry and the switching component;
   an excess current shunt path connected in parallel with the array and the secondary circuitry;

excess current shunt circuitry that senses current flowing in the secondary circuitry and that shunts current in the secondary circuitry in excess of an excess current threshold to the excess current shunt path, whereby overflow current above a first threshold for the array (100) is shunted away from the array and excess current above a second threshold is shunted from the secondary circuitry to the excess current shunt circuitry;

in which the array, the secondary circuitry, and the excess current shunt circuitry are in separate parallel, but switched electrical paths.

2. A lighting system as in claim 1, in which the voltage source (10) supplies alternating current (AC), further comprising rectification circuitry that rectifies the AC current before it is applied to the array (100).

3. A lighting system as in claim 2, further including a current-limiting element (C2) in series with the AC voltage source (10) and between the voltage source and the array (100), the AC voltage source and the current-limiting element together forming an AC current source for the array (100).

4. A lighting system as in claim 1, further comprising a capacitor (C1) connected in parallel with the array (100) so as to smooth and average the current applied to the array.

5. A lighting system as in claim 1, in which the voltage source (10) supplies direct current (DC) to the array.

6. A lighting system as in claim 5, in which the voltage source (10) is a battery (BAT).

7. A lighting system as in claim 5, in which the voltage source (10) is an array of photoelectric elements (100).

8. A lighting system as in claim 1, in which the array state is the amount of electric current passing through the array (100).

9. A lighting system as in claim 1, in which:
the array state is temperature;
the array state circuitry includes a temperature-sensitive element that, upon sensing a temperature greater than a threshold temperature, chokes off biasing current to the secondary circuitry and thereby reduces the array's (100) nominal current.

10. A lighting system as in claim 1, in which the load is at least one resistive element.

11. A lighting system as in claim 1, in which the load is a secondary array (200) of light-emitting, solid state elements.

12. A lighting system as in claim 1, further comprising a curved base (170) on which the light-emitting, solid state elements of the array (100) are mounted such that the light beams of adjacent light-emitting, solid state elements overlap and the array as a whole provides wide-angle illumination.

13. A lighting system as in claim 12, in which the base is substantially cylindrical.

14. A lighting system as in claim 1, in which the light-emitting, solid state elements are light-emitting diodes (LEDs).

15. A lighting system as in claim 1, in which the light-emitting, solid state elements are laser diodes.

16. A lighting system as in claim 1, in which the array (100) comprises a first plurality of current paths, each of which includes a second plurality of series-connected, light-emitting solid-state elements.

* * * * *